Patented July 18, 1944

2,354,012

UNITED STATES PATENT OFFICE 2,354,012

DIHYDROXY HALOGENATED DIPHENYL METHANES AND PROCESS FOR MAKING SAME

William S. Gump, Montclair, N. J., assignor to Burton T. Bush, Inc., New York, N. Y., a corporation of New Jersey No Drawing. Original application July 26, 1941, Serial No. 404,155. Divided and this application November 20, 1943, Serial No. 511,113

4 Claims. (Cl. 260—619)

This invention relates to new condensation products and their salts, and to a process for producing them.

This application is a division of U. S. patent application Serial No. 404,155, filed July 26, 1941.

An object of this invention is the provision of novel materials having unexpected and valuable germicidal properties.

Another object of this invention is a novel process for making such novel materials just referred to.

The foregoing objects, and others as well, are accomplished by the present invention, and the manner or manners in which these objects and others, are accomplished can be understood from the following description.

The novel materials of this invention have the general formula:

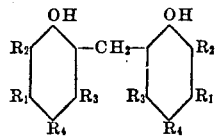

wherein $R_1$ is a member selected from the group consisting of hydrogen, chlorine and bromine; $R_2$ is a member selected from the group consisting of chlorine and bromine; $R_3$ is a member selected from the group consisting of chlorine and bromine; $R_4$ is a member selected from the group consisting of chlorine and bromine; and their mono-alkali metal and mono-alkaline earth metal salts. Examples of substances which are within the scope of this invention are 2,2'-dihydroxy-3,5,6-3',5',6'-hexachloro diphenyl methane; 2,2'-dihydroxy-3,4,5,6,-3',4',5',6'-octachlorodiphenyl methane; 2,2'-dihydroxy-5,5'-dibromo-3,6-3',6'-tetrachloro diphenyl methane; 2,2'-dihydroxy-3,5,6-3',5',6'-hexabromo diphenyl methane; the mono-sodium (or potassium or lithium) salt of 2,2'-dihydroxy-3,5,6-3',5',6'-hexachloro diphenyl methane; the mono-sodium (or potassium or lithium) salt of 2,2'-dihydroxy-3,4,5,6-3',4',5',6'-octachloro diphenyl methane; the mono-sodium (or potassium or lithium) salt of 2,2'-dihydroxy-3,5,6-3',5',6'-hexabromo diphenyl methane; the mono-sodium (or potassium or lithium) salt of 2,2'-dihydroxy-5,5'-dibromo-3,6-3',6'-tetrachloro diphenyl methane; the mono-barium (or calcium or magnesium or strontium) salt of 2,2'-dihydroxy-3,5,6-3',5',6'-hexachloro diphenyl methane; the mono-barium (or calcium, or magnesium or strontium) salt of 2,2'-dihydroxy-3,4,5,6-3',4',5',6'-octachloro diphenyl methane; the mono-barium (or calcium or magnesium or strontium) salt of 2,2'-dihydroxy-3,5,6-3',5',6'-hexabromo diphenyl methane; the mono-barium (or calcium or magnesium or strontium) salt of 2,2'-dihydroxy-5,5'-dibromo-3,6-3',6'-tetrachloro diphenyl methane, etc.

The condensation products of this invention may be prepared by condensing certain phenols with formaldehyde or formaldehyde-yielding substances in the presence of sulfuric acid at temperatures between about 0° C. and 20° C., the reaction occurring, advantageously, in the presence of a liquid which is inert under the conditions of the reaction and which is further characterized by being a solvent for the phenol employed and also by being miscible with sulfuric acid. The resulting 2,2'-dihydroxy halogenated diphenyl methane may be isolated in known manner or by a novel method hereinafter described. An example of a known way to isolate the desired condensation product is that wherein the products of reaction are quenched in ice or ice water and the resulting precipitate is washed acid-free; the washed precipitate is then dried and recrystallized from a solvent such as benzene or toluene; and finally, the recrystallized product is dried to remove substantially all of the solvent therefrom.

The alkali metal salts of the condensation products may be prepared by treating a solution of the condensation products of this invention with an aqueous alkali hydroxide solution and filtering the resulting alkali metal salt.

The alkaline earth metal salts of the condensation products may be prepared by treating a solution of an alkali metal salt of the condensation products of this invention with a solution of a water-soluble salt of an alkaline earth metal.

The phenols which may be employed in the process of this invention are those having the general formulae:

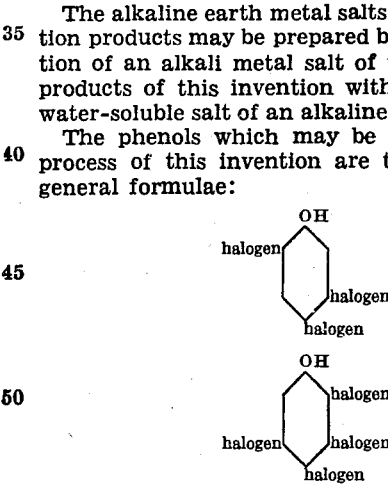

It is noted that one position ortho to the phenolic hydroxyl is free in both general formulae just given. As examples of phenols which may be used are included:

2,3,4,5,-tetrachloro phenol; 2,4,5-trichloro phenol; 2,4,5-tribromo phenol; 2,5-dichloro-4-bromo phenol; 2,5-dibromo-4-chlorophenol; 2,3,4,5-tetrabromo phenol; etc.

Iodine- or fluorine-containing phenols may also be employed.

The aldehydic materials which are included in this invention are formaldehyde and materials capable of yielding formaldehyde under the conditions of the reaction. As specific examples of aldehydic materials which have been employed may be mentioned, for example, aqueous solutions of formaldehyde (e. g. of 35 to 40% formaldehyde content) and paraformaldehyde.

Sulfuric acid solutions of various acid concentrations may be employed. Excellent results have been obtained when the initial sulfuric acid concentration of the sulfuric acid solution employed is about 90 to 95%, or even somewhat higher. Satisfactory results, however, can be obtained when sulfuric acid of a concentration as low as approximately 85% is used.

The inert liquids in which the reaction may be conducted are the aliphatic water-miscible alcohols, for example methyl alcohol, ethyl alcohol, isopropyl alcohol, etc. Such liquids are inert under the conditions of the reaction, and are further characterized by being solvents for the halogenated phenols employed and by being miscible with sulfuric acid. By way of indicating the advantage of employing liquids possessing all of the properties just noted, it may be stated that when ligroin is employed, the desired condensation reaction does not proceed in any measurable degree. Ligroin does not possess the property of being miscible with sulfuric acid, but it is inert under the reaction conditions and is a solvent for the halogenated phenols employed.

The alkali metals encompassed by this invention include sodium, lithium and potassium.

Among the alkaline earth metals within the scope of this invention are barium, strontium, calcium and magnesium.

The amounts of reactants and the other ingredients employed in the present process may be varied over wide limits. Good results are obtained when 2 mols of the phenol per each mol equivalent of formaldehyde are used. Amounts of the phenol between 1.8 to 2.5 mols per mol of formaldehyde give satisfactory results. Larger amounts of the phenol, although they may be used, are not recommended because of the necessity of removing the unreacted phenol from the condensation products after the termination of the reaction.

In calculating the amount of formaldehyde used when aqueous formaldehyde is employed as the aldehydic material, only the actual formaldehyde content of the aldehyde solution is considered. For example, if 75 grams of a 40% formaldehyde solution are used, the actual formaldehyde content is 30 grams. When formaldehyde-yielding substances are employed as the aldehydic material, the amount of formaldehyde formed during the reaction is taken as the amount of formaldehyde.

The amount of sulfuric acid solution which may be used in the present process varies. It is preferred to use sulfuric acid in an amount not substantially less than four times the weight of the phenol employed. Advantageously, sulfuric acid in an amount equal to six times the weight of the phenol employed, may be used. It suffices that there is a sufficient amount of sulfuric acid present to enable one to obtain a workable reaction mixture, that is, one which can be stirred satisfactorily in stirring equipment usually employed in such reactions. Any amount of sulfuric acid greater than that required to just give a workable mixture may be employed, economic considerations primarily dictating the actual amount to use.

The liquid, for example, methyl alcohol, used in the reaction mixture can also vary in amount. At least enough liquid should be used so as to dissolve the phenol employed. It is advisable not to use so much of such liquid that the concentration of the sulfuric acid, after the completion of the reaction, is below approximately 70%, calculated on the basis of the total weight of sulfuric acid, water and solvent present after the completion of the reaction. Good results have been obtained when liquids such as methyl alcohol are used in an amount between 20 to 30% of the weight of phenol employed, but larger amounts of such liquids may be employed.

Equimolecular quantities of alkali metal hydroxide and condensation product are used in preparing the alkali metal salts of this invention. In preparing the alkaline earth metal salts of this invention, one molecular equivalent of the water-soluble alkaline earth salt is reacted with 2 molecular equivalents of the alkali metal salt of the condensation product employed.

The condensation reaction may be conducted at temperatures between 0° C. and 20° C., but is preferred to operate at a temperature of 10° C. or lower, in order to avoid the formation of substantial amounts of undesirable by-products, such as resins.

The condensation reaction may be conducted over a period of 12 to 15 hours, or longer, in order to give good yields.

The reactants and other ingredients used in the condensation process are advantageously added in a certain manner. The phenol, aldehyde and inert liquid are stirred together and then added slowly to the sulfuric acid while the temperature of the reaction mixture is maintained between about 0° C. and 20° C.

As hereinbefore mentioned, a novel method of working up the products of condensation reaction also forms a feature of the present invention. In this method, herein termed the "solvent extraction method," the reaction products are diluted with ice or cold water and the resulting mixture is treated with a mixture of liquids, such as toluene and isopropyl ether. Such a solvent mixture, aided by the presence of the previously-defined "inert liquids," for example methyl alcohol, dissolves substantially all of the 2,2'-dihydroxy halogenated diphenyl methane present and there are obtained 2 layers: a solvent layer, containing the desired condensation products; and an acid layer. The acid layer is separated, the solvent phase is washed acid-free, and most of the ether then is distilled off from the solvent phase remaining after removal of the acid layer. After the residue from the ether distillation is cooled, an appreciable amount of the desired condensation product crystallizes from solution, in pure form. The mother liquor is concentrated and cooled, whereupon more of the substantially pure condensation product crystallizes out of solution.

Enough ice or cold water is added to the reaction products to dilute the sulfuric acid to a strength such that substantially no isopropyl ether (or other such solvent as herein defined) is soluble in the acid solution. It has been found that when the sulfuric acid concentration in the acid solution is approximately 40% by weight, or lower, this purpose is achieved. Any isopropyl ether (or other such solvent as herein defined) which dissolves in the acid solution, carries along with it some of the desired condensation product and the yield of the latter is correspondingly affected adversely.

The particular advantages of the foregoing method of working up the condensation products of this invention are that there is no need for filtering a mass containing sulfuric acid and that no intermediate drying step is required. As is well known, special acid-resistant filtering apparatus is required to filter a mass containing a large amount of sulfuric acid solution. The elimination of the intermediate drying step results in lower costs. This may be appreciated when it is considered that the intermediate drying step used in the known method of working up the condensation products involves the elimination of the water. Such elimination is difficult and relatively costly. The only drying step used in the novel extraction method entails the elimination of easily removable solvents such as benzene or toluene.

The solvent mixture used in the "solvent extraction method" comprises a mixture of at least two liquids, one liquid or group of liquids in the mixture possessing good solvent properties for the 2,2'-dihydroxy halogenated diphenyl methanes of this invention, and the other liquid, or group of liquids, possessing such poor solvent properties for such condensation products as will enable the latter to crystallize from such liquids after the liquids having good solvent properties are substantially all removed from the solvent mixture. It is requisite that the liquid or group of liquids possessing good solvent action on the 2,2'-dihydroxy halogenated diphenyl methanes should have an appreciably lower boiling point or boiling points than the non-solvent liquid or liquids. This is to enable the easy removal of the liquid or liquids having good solvent action from the solvent mixture by atmospheric distillation.

As examples of liquids which may be employed in the aforementioned solvent mixture isopropyl ether and toluene may be mentioned. The former is a good solvent for the 2,2'-dihydroxy halogenated diphenyl methanes of this invention and the latter is a poor solvent for such compounds. It has been found that good results are obtained when the total percentage of the liquid or liquids having good solvent action on the condensation products of this invention is between 20 to 50% by weight of the total solvent mixture. Small or larger percentage amounts of such liquid or liquids may be used, however, if desired.

The solvent mixture used in the "solvent extraction method" is used in amounts at least 4 times the weight of the phenol used.

The condensation products of this invention are white (also may be termed colorless), crystalline, substantially odorless and tasteless substances having sharp melting points. They are only very slightly soluble in water and are soluble in dilute aqueous alkali solutions and in organic solvents, such as acetone, methyl alcohol, ethyl alcohol and isopropyl ether.

The alkali metal and alkaline earth metal salts of this invention are white, substantially odorless substances which do not possess clearly-defined melting points, but decompose at varying temperatures upon heating. They are slightly soluble in water at room temperature, i. e. about 20°–25° C. and more soluble in boiling water. Their solubility in alcohol and acetone, even at room temperatures, is greater than their solubility in boiling water. The salts are more soluble in dilute alkalies than in water.

The substances of this invention—the condensation products and their corresponding alkali and alkaline earth metal salts—may be used as antiseptic, bactericidal, bacteriostatic, fungicidal and preservative agents, in solid, liquid or emulsion form, either per se or in admixture with other substances.

The condensation products of this invention possess the unusual property of exhibiting strong bactericidal power even in the presence of more than equimolecular amounts of alkali hydroxide. For example, it has been found that the condensation products of this invention are bactericidal in the presence of 5 to 10 times their molecularly equivalent amounts of alkali hydroxide. So far as is known, no other phenolic products possess this property of being bactericidal in the presence of such large amounts of alkali hydroxide.

The following specific examples, in which all parts are by weight except where specifically stated otherwise, indicate how the process of this invention may be practiced and how some of the novel substances may be prepared. The examples are for purposes of illustration and are not to be construed as limiting the scope of the invention.

EXAMPLE 1

*Preparation of 2,2'-dihydroxy-3,5,6-3',5',6'-hexachloro diphenyl methane*

A mixture prepared from 200 parts of 2,4,5-trichloro-phenol; 36 parts methyl alcohol and 40 parts of aqueous formaldehyde solution (35 to 40% formaldehyde strength) is added, over a period of about 4 hours, to 1440 parts of sulfuric acid (93% strength), the contents being agitated throughout and the temperature being maintained between 0° C. and 5° C. The conditions are maintained for about 20 hours following the completion of the foregoing addition step. The reaction mixture is then quenched on crushed ice, and crude 2,2'-dihydroxy-3,5,6-3',5',6'-hexachloro diphenyl methane is separated from the acid by filtration and is washed acid-free, with water.

The crude product is refined by dissolving in aqueous sodium hydroxide solution. Any amounts of alkali insoluble material are filtered off and the filtrate is acidified in order to reprecipitate the free phenol.

The precipitate thus obtained is washed acid-free, dried, and then recrystallized from benzene, toluene or ethylene dichloride.

The resulting pure 2,2'-dihydroxy-3,5,6-3',5',6'-hexacloro diphenyl methane comprises white or colorless needles having a melting point of 161°–162° C. and having strong bactericidal power.

EXAMPLE 2

*Preparation of mono-sodium salt of 2,2'-dihydroxy-3,5,6-3',5',6'-hexachloro diphenyl methane*

2.04 grams of 2,2'-dihydroxy-3,5,6-3',5',6'- hexachloro diphenyl methane, prepared according to Example 1, were dissolved in 5 cubic centimeters of acetone, and 0.2 gram of sodium hydroxide, dissolved in 50 cubic centimeters of water, were added. The mixture was heated to about 50° C. and then allowed to cool to about 20° C. After filtering, washing and drying the resulting precipitate, there were obtained about 2 grams of fine, white needles of the mono-sodium salt of 2,2'-dihydroxy-3,5,6-3',5',6'-hexachloro diphenyl methane.

Example 3

*Preparation of mono-barium salt of 2,2'-dihydroxy-3,5,6-3',5',6'-hexachloro diphenyl methane,* having the formula:

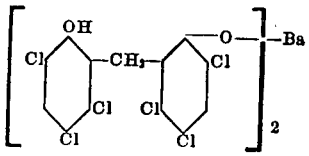

1.02 grams of 2,2'-dihydroxy-3,5,6-3',5',6-hexachloro diphenyl methane were dissolved in 9.8 cubic centimeters of N/2 alcoholic potassium hydroxide. To this solution was added a solution of 0.305 gram of $BaCl_2.2H_2O$ in 50 cubic centimeters of water. The precipitate was filtered, washed with water and dried for 3 hours at 100° C.

The barium salt obtained was a white powder.

Example 4

*Preparation of 2,2'-dihydroxy-3,4,5,6-3',4',5',6'-octachloro diphenyl methane*

17.5 grams of 2,3,4,5-tetrachloro phenol, 10 cubic centimeters of methyl alcohol and 1.2 grams of paraformaldehyde were dispersed by gentle heating (not above 40° C.). This mixture was added to 80 cubic centimeters of sulfuric acid (95%) over a period of about 30 minutes and while a temperature of −2° C. to 0° C. was maintained in the reaction mixture. About 30 minutes after the completion of the foregoing addition, another 80 cubic centimeters of sulfuric acid (95%) were added to the reaction mixture. Stirring was continued for 2 hours and the temperature was maintained at or under 10° C. during this period. The reaction mixture was then permitted to stand at room temperature (about 20° C.) for 16 hours, without agitation.

500 cubic centimeters of water were added to the above and the mixture was heated to about 60° C. and stirred with a mixture of 500 cubic centimeters of toluene and 50 cubic centimeters of isopropyl ether. The solvent layer was separated and distilled until about 300 cubic centimeters thereof remained in the distilling flask.

On cooling the residue remaining in the distilling flask, there were obtained about 8 grams of tan-colored crystals, which yielded fine, white needles, melting at 255° C., when recrystallized from toluene.

Example 5

*Preparation of mono-sodium salt of 2,2'-dihydroxy-3,4,5,6-3',4',5',6'-octachloro diphenyl methane*

2.38 grams of 2,2'-dihydroxy 3,4,5,6-3',4',5',6'-octachloro diphenyl methane, prepared according to Example 4, were dissolved in 5 cubic centimeters of acetone, and 0.2 gram of sodium hydroxide, dissolved in 50 cubic centimeters of water, were added. The mixture was heated to about 50° C. and then allowed to cool to about 20° C. After filtering, washing and drying the resulting precipitate, there were obtained fine, white needles of the mono-sodium salt of 2,2'-dihydroxy-3,4,5,6-3',4',5',6'-octachloro diphenyl methane.

Example 6

*Preparation of mono-barium salt of 2,2'-dihydroxy - 3,4,5,6-3',4',5',6' - octachloro diphenyl methane,* having the formula:

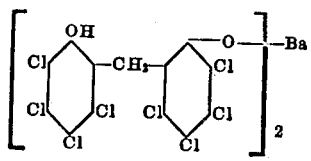

1.19 grams of 2,2'-dihydroxy-3,4,5,6-3',4',5',6'-octachloro diphenyl methane were dissolved in 9.8 cubic centimeters of N/2 alcoholic potassium hydroxide. To this solution was added a solution of 0.305 gram of $BaCl_2.2H_2O$ in 50 cubic centimeters of water. The precipitate was filtered, washed with water and dried for 3 hours at 100° C.

The barium salt obtained was a white powder.

Example 7

*Preparation of 2,2'-dihydroxy-3,5,6-3',5',6'-hexabromo diphenyl methane*

A mixture of 30 grams of 2,4,5-tribromo phenol, 7 cubic centimeters of methyl alcohol and 3.7 grams of formaldehyde solution (40% formaldehyde) was added to 120 cubic centimeters of sulfuric acid (95%), while maintaining the temperature of the reaction mixture at 0° C. The addition required 45 minutes and was accompanied by agitation of the reaction mixture.

The temperature of the reaction mixture was allowed to reach room temperature after the foregoing addition step and this temperature was maintained for 16 hours.

200 cubic centimeters of water were added to the reaction mixture and the resulting dark oil, which separated, was heated to about 60° C. and extracted 4 times with toluene, about 65 cubic centimeters of toluene being used each time. The toluene extracts were combined and the toluene was distilled off. 250 cubic centimeters of naphtha were added to the residue and this mixture was heated to 50° C.

The naphtha portion was cooled down to room temperature, whereupon a precipitate formed. After recrystallization of this precipitate from 75 cubic centimeters of toluene, 7 grams white, fine, needles, melting at 180° C. were obtained.

Example 8

*Preparation of mono-sodium salt of 2,2'-dihydroxy-3,5,6-3',5',6'-hexabromo diphenyl methane*

3.36 grams of 2,2' - dihydroxy - 3,5,6-3',5',6'-hexabromo diphenyl methane, 0.2 gram sodium hydroxide and 50 cubic centimeters of water were heated to boiling. The clear solution was allowed to cool and the salt which formed was filtered, washed and then dried (3 hours at 100° C.).

This was a white, crystalline material.

EXAMPLE 9

*Preparation of mono-barium salt of 2,2'-dihydroxy-3,5,6-3',5',6'-hexabromo diphenyl methane,* having the formula:

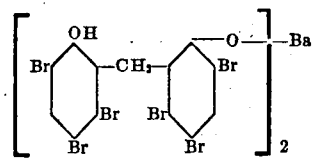

1.68 grams of 2,2' - dihydroxy - 3,5,6-3',5',6'-hexabromo diphenyl methane were dissolved in 9.8 cubic centimeters of N/2 alcoholic potassium hydroxide. To this solution was added a solution of 0.305 gram of BaCl₂.2H₂O in 50 cubic centimeters of water. The precipitate was filtered, washed and then dried for 3 hours at 100° C.

The salt obtained was a white powder.

EXAMPLE 10

*Preparation of 2,2'-dihydroxy-3,6-3',6'-tetrachloro-5,5'-dibromo diphenyl methane*

350 cubic centimeters of sulfuric acid (93%) were cooled to 0° C. and maintained thereat while adding thereto, while stirring, the reaction mixture, a mixture of 80 grams of 2,5-dichloro-4-bromophenol; 30 cubic centimeters of methyl alcohol and 12 grams of formaldehyde solution (40% formaldehyde). One hour was devoted to the foregoing addition step. The reaction mixture was then maintained at a temperature of about 5° C. for two days, and then was quenched with ice and the desired condensation product was isolated and purified in known manner. Twenty grams of colorless, fine needles, melting at 166°–166.5° C. were obtained.

EXAMPLE 11

*Preparation of the mono-sodium salt of 2,2'-dihydroxy - 3,6 - 3',6' - tetrachloro-5,5'-dibromo diphenyl methane*

2.48 grams of 2,2'-dihydroxy-3,6-3',6'-tetrachloro-5,5'-dibromo diphenyl methane; 0.2 gram sodium hydroxide and 50 cubic centimeters of water were heated to boiling. The clear solution was allowed to cool and the salt which formed was filtered, washed and then dried (3 hours at 100° C.).

A white, crystalline substance was obtained.

EXAMPLE 12

*Preparation of mono-barium salt of 2,2'-dihydroxy-3,6-3',6'-tetrachloro-5,5'-dibromo diphenyl methane,* having the formula:

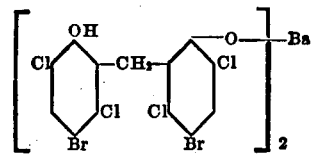

1.24 grams of 2,2'-dihydroxy-3,6-3',6'-tetrachloro-5,5'-dibromo diphenyl methane were dissolved in 9.8 cubic centimeters of N/2 alcoholic potassium hydroxide. To this solution was added a solution of 0.305 gram of BaCl₂.2H₂O in 50 cubic centimeters of water. The resulting precipitate was filtered, washed and dried (3 hours at 100° C.). It was a white, crystalline substance.

By proceeding according to the procedures of Examples 2, 5, 8 and 11 the potassium and lithium salts may be obtained by employing amounts of potassium hydroxide or lithium hydroxide equivalent to the amount of sodium hydroxide employed.

Similarly, the magnesium, calcium or strontium salts of the condensation products may be obtained by employing amounts of soluble magnesium, calcium or strontium salts molecularly equivalent to the amount of the barium salt employed in Examples 3, 6, 9 and 12 and by following the procedure given in these examples.

In all cases, the alkali metal salts and the alkaline earth metal salts of the condensation products are white, crystalline, substantially odorless substances, having no melting point and possessing marked bactericidal value.

The foregoing illustrates the practice of the invention which, however, is not to be limited thereby but is to be construed as broadly as permissible in view of the prior art and limited solely by the appended claims.

I claim:

1. Compounds selected from the class consisting of those having the general formula:

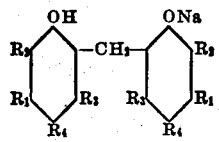

wherein $R_1$ is a member selected from the group consisting of hydrogen, chlorine and bromine; $R_2$ is a member selected from the group consisting of chlorine and bromine; $R_3$ is a member selected from the group consisting of chlorine and bromine and $R_4$ is a member selected from the group consisting of chlorine and bromine.

2. The compound having the formula:

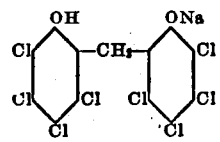

3. The compound having the formula:

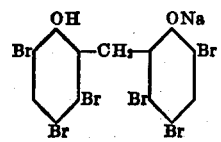

4. The compound having the formula:

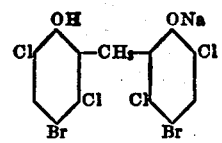

WILLIAM S. GUMP.